H. A. CHURCH.
Ornamental Chain.

No. 204,800. Patented June 11, 1878.

WITNESSES

William L. Cox.

Joseph A. Miller Jr.

INVENTOR

Henry A. Church by Joseph A. Miller
Attorney

UNITED STATES PATENT OFFICE.

HENRY A. CHURCH, OF PROVIDENCE, RHODE ISLAND.

IMPROVEMENT IN ORNAMENTAL CHAINS.

Specification forming part of Letters Patent No. 204,800, dated June 11, 1878; application filed December 3, 1877.

*To all whom it may concern:*

Be it known that I, HENRY A. CHURCH, of the city and county of Providence, and State of Rhode Island, have invented new and useful Improvements in Ornamental Chains; and I hereby declare that the following is a full, clear, and exact description of the same, reference being had to the accompanying drawings, forming part of this specification.

This invention has reference to that class of ornamental chains in which the links are formed by stamping or otherwise out of thin metal plates, so that when doubled the one blank will form a complete link, the central portion, when doubled, forming the hinge and one end the loop, by means of which the several links are secured together; and consists in the peculiar arrangement by which the two ends of the doubled blank, after being passed through the hinge of the next link, are interlocked within the interior of the links, so that the ends of each link are concealed from view and the several links firmly secured to each other without soldering any portion of the links.

Figure 1:
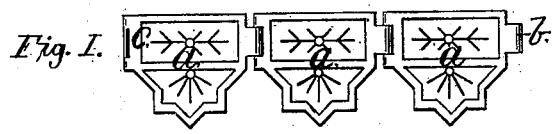
Figure 2:
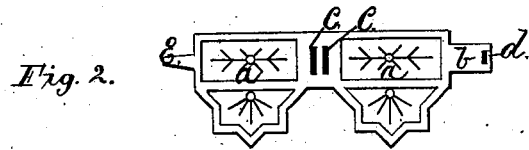
Figure 3:
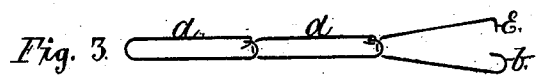

Figure 1 represents a chain made of doubled sheet-metal links, both sides of which are alike, and in which the links are secured one to the other by a loop passing through two slits of the next link and held by a bent hook. Fig. 2 is a view of one blank, forming, when doubled, one link in which both sides are alike. Fig. 3 is a longitudinal section of a chain made after this invention.

In the drawings, A represents one of the sides of a link out of which the chain is made. The outlines or ornamentations form no part of this invention, as any form of link and any desired design may be adapted in chains of this construction. Arm, neck, and other bands and girdles may also be made in the same manner as chains out of doubled sheet-metal links, and be interlocked and formed without soldering any part.

*b* is the loop, formed at one end of the blank, Fig. 2, of a width nearly the length of the slits *c c*, which, when the blank is doubled, forms the hinge. The loop *b* is provided with the slit *d*, of a width nearly the width of the tongue E.

When a chain is made, the blank shown in Fig. 2 is first doubled, so that the metal between the two slits *c c* will form one end, and the loop *b* and tongue E the other end, of the link. A number of links so bent and formed are secured together by passing the loop *b* through the slits *c c*. The tongue E is now bent and passed through the slit *d* and secured, as shown in Fig. 3, and the chain is thus completed without soldering.

In the chains heretofore made of similar blanks, where provided with the slits *c c* and the loop *b*, the blank was bent in the same manner, and the links secured one to the other by passing the loop *b* through the slits *c c*, and by soldering the end of the loop *b* to the blank.

The object of this invention is to avoid this soldering of the loop, as it requires considerable time and skill, and necessitates the refinishing of the chain and repolishing of the same, which subject the hinges to considerable wear.

In the manufacture of this class of jewelry it is important to finish and complete the separate parts before securing the same together, as they can be more readily handled and the different parts readily polished by machinery in every part. When, now, such articles have to be secured by solder, the heat used in soldering discolors the article, destroys the polish, and so softens the metal that it is liable to bend and become distorted; the surplus solder must be removed, the color must be restored, and the whole article refinished; but the injury produced by the heat on the metal cannot be repaired in such articles, as they cannot be hardened. They are, therefore, liable to bend and lose their shape.

By the present invention all this is avoided. The blank can be finished and polished before it is bent, and the finished links put together without soldering. The ends, being interlocked, are firmly held, forming a strong ornamental chain, in which both sides are alike, in which the metal has the stiffness produced by stamping, and which may be highly finished by machinery, and thus a superior article produced at a price impossible in the old method.

I am aware that ornamental chains have been made wherein the links are provided with two intermediate slits, and the opposite ends of the link with a slot and tongue, and hence I make no claim to such construction, broadly considered.

I am also aware it is not new to form the links of an ornamental chain with a tongue on one end of the blank and a slotted loop on the other end, while the central portion of the link is provided with two slits for receiving the tongue of the adjacent link, such construction being shown in the patent granted to L. Heckmann, December 11, 1877, No. 198,109, and hence I make no claim to such construction of parts; but

Having thus described my invention, I claim as new and desire to secure by Letters Patent—

A chain composed of links consisting of the sides $a\ a$, having two slits, $c\ c$, formed in one end of the link, while the opposite ends are provided with the loop $b$ and the tongue E, provided with slit $d$, the said links, when connected together, having their ends turned beneath and concealed by the sides of the link, substantially as set forth.

HENRY A. CHURCH.

Witnesses:
 JOSEPH A. MILLER,
 D. B. POTTER.